US009710107B1

(12) United States Patent
Makuch et al.

(10) Patent No.: US 9,710,107 B1
(45) Date of Patent: *Jul. 18, 2017

(54) INPUT CONTROL ASSIGNMENT

(71) Applicant: Amazon Technologies, Inc., Seattle, WA (US)

(72) Inventors: Jason David Makuch, Seattle, WA (US); Pavan Kumar Surishetty, Seattle, WA (US); Joshua Wascom, Seattle, WA (US); Vinod Murli Mamtani, Bellevue, WA (US); Jean-Yves Pip Courbois, Seattle, WA (US); Gerard Joseph Heinz, II, Seattle, WA (US); Kimberly Nicole Hunter, Seattle, WA (US); Grant Travis Patrick Wilson, Woodinville, WA (US); Matthew Louis Vahlsing, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,607

(22) Filed: Jul. 20, 2015

Related U.S. Application Data

(63) Continuation of application No. 14/134,429, filed on Dec. 19, 2013, now Pat. No. 9,086,759.

(51) Int. Cl.
*G06F 3/041* (2006.01)
*G06F 3/01* (2006.01)

(52) U.S. Cl.
CPC ............ *G06F 3/0418* (2013.01); *G06F 3/017* (2013.01); *G06F 3/0412* (2013.01); *G06F 2203/04101* (2013.01); *G06F 2203/04104* (2013.01); *G06F 2203/04105* (2013.01); *G06F 2203/04808* (2013.01)

(58) Field of Classification Search
CPC ..... G06F 3/04883; G06F 3/0481; G06F 3/044
See application file for complete search history.

(56) References Cited

U.S. PATENT DOCUMENTS

| | | |
|---|---|---|
| 2008/0180399 A1 | 7/2008 | Cheng |
| 2011/0221701 A1 | 9/2011 | Zhang et al. |
| 2012/0013543 A1* | 1/2012 | Shenfield ............ G06F 3/0481 345/173 |
| 2012/0262386 A1 | 10/2012 | Kwon et al. |
| 2012/0327009 A1 | 12/2012 | Fleizach |
| 2013/0271375 A1 | 10/2013 | Griffin et al. |
| 2013/0271430 A1 | 10/2013 | Nakamura |
| 2013/0300710 A1* | 11/2013 | Cho ....................... G06F 3/044 345/174 |
| 2014/0215384 A1* | 7/2014 | You ..................... G06F 3/04883 715/784 |

* cited by examiner

*Primary Examiner* — Gerald Johnson
(74) *Attorney, Agent, or Firm* — Baker & Hostetler LLP

(57) ABSTRACT

Various techniques may be employed for assigning user inputs such as a touch on a touchscreen to various input controls such as buttons or other features provided on a touchscreen. One example input assignment technique is a nearest neighbor technique, whereby a touch may, for example, be assigned to an input control that is positioned closest to the touch location. Another example input assignment technique is an angle and distance technique, whereby a touch may, for example, be assigned to an input control based on an angle and a distance of the touch relative to a prior touch.

19 Claims, 9 Drawing Sheets

INPUT CONTROL ASSIGNMENT

CROSS-REFERENCE TO RELATED APPLICATIONS

This application is a continuation of U.S. patent application Ser. No. 14/134,429 filed on Dec. 19, 2013, the disclosure of which is hereby incorporated herein by reference in its entirety.

BACKGROUND

As content items such as video games continue to become increasingly popular and widespread, a number of new and sophisticated techniques have evolved for providing user input for participation with the content items. One such technique involves the use of a virtual gamepad, which refers to software that provides buttons and other input controls on touchscreen devices such as smart phones and tablets. As an example, in some cases, a virtual gamepad may be executed on a touchscreen device that sends inputs to a video game that is displayed on a separate display device such as a television. In this example, a player may, in some cases, be watching the displayed video game on the television while simultaneously holding the touchscreen and attempting to touch controls on the touchscreen without looking at the touchscreen. The player may, for example, continue to look at the television for almost all of a game playing session and may only have time to look down at the virtual gamepad during breaks or pauses in game action, which may occur infrequently.

One problem associated with the use of virtual gamepads is that touchscreens are flat surfaces that may provide minimal, if any, tactile feedback to users. For example, traditional gamepads typically include controls that may be raised and/or lowered with respect to the main surface of the gamepad and may be separated by grooves or other spaces from the main surface of the gamepad. By contrast, touchscreens typically include a continuous flat surface on which buttons and other input controls may, for example, be visually indicated. Thus, users of a virtual gamepads may have difficulty properly selecting intended input controls, for example, when they are not looking at the input controls.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Techniques for input control assignment are disclosed herein. In particular, in some cases, various techniques may be employed for assigning user inputs such as a touch on a touchscreen to various input controls such as buttons or other features provided on a touchscreen. One example input assignment technique is a nearest neighbor technique, whereby a touch may, for example, be assigned to an input control that is positioned closest to the touch location. Another example input assignment technique is an angle and distance technique, whereby a touch may, for example, be assigned to an input control based on an angle and a distance of the touch relative to a prior touch.

In some cases, to assist with performance of the angle and distance techniques, angle and distance information associated with one or more input controls may be maintained. More specifically, for one or more specified angles or range of angles, the maintained information may indicate various distance ranges. For example, a distance range corresponding to a first input control may indicate a range within which it assumed that a user touch is intended for the first input control, while a distance range corresponding to a second input control may indicate a range within which it is assumed that a user touch is intended for the second input control.

In some example implementations of the angle and distance techniques, a first touch may be detected at a first screen location and assigned to a first input control. An indication of the first screen location and an indication of the assignment of the first touch to the first input control may be at least temporarily maintained. A second touch may then be detected at a second screen location. Upon detection of the second touch, both an angle and a distance may be calculated for the second screen location relative to the first screen location. One or more distance ranges associated with the calculated angle may then be identified, for example, based on maintained angle and distance information. It may then be determined which of the identified distance ranges includes the calculated distance. If, for example, the calculated distance is within a distance range corresponding to the first input control, then the user touch may be assigned to the first input control. If, for example, the calculated distance is within a distance range corresponding to a second input control, then the user touch may be assigned to the second input control.

Figure 1:
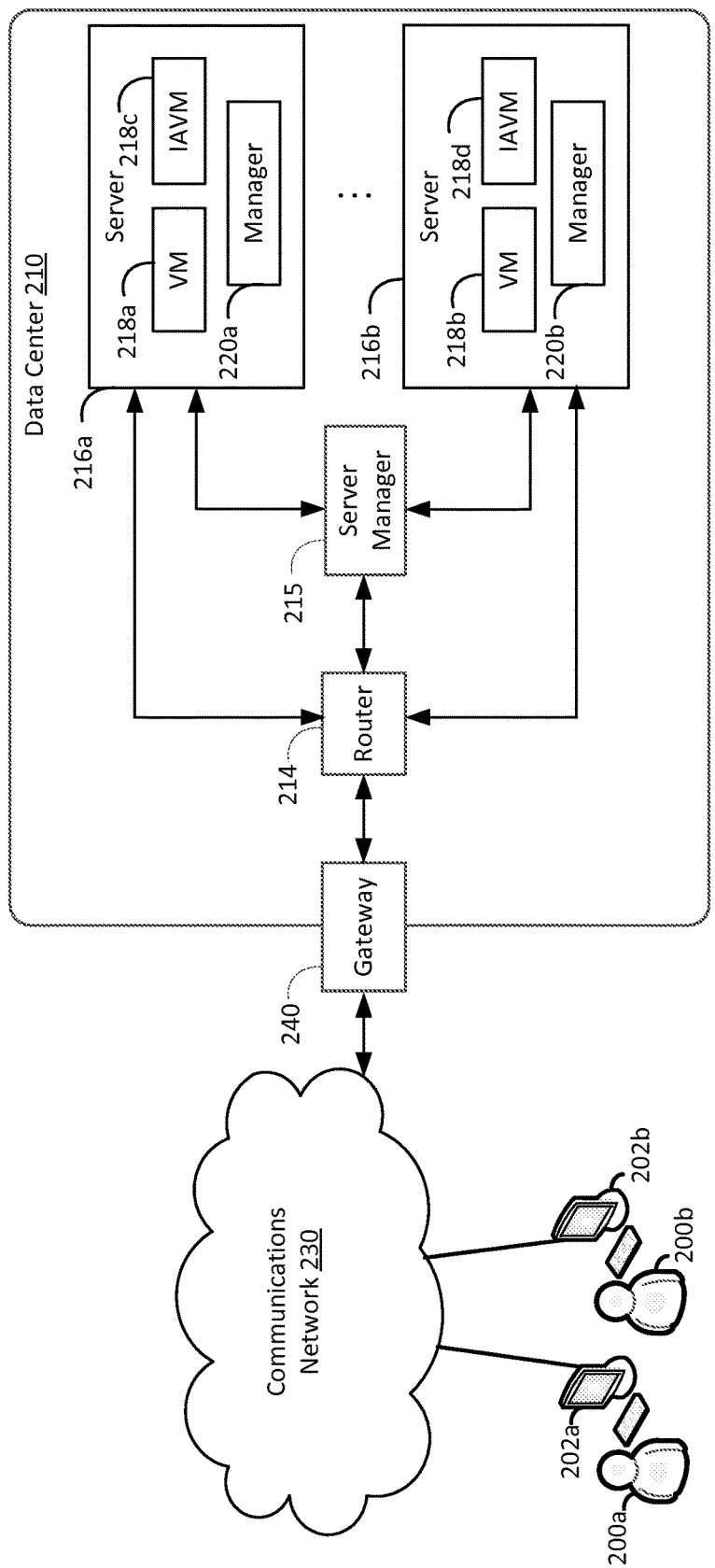
FIG. 1 is a diagram illustrating an example computing system that may be used in some embodiments.

In some cases, the input assignment techniques disclosed herein may be employed in connection with user input associated with video games or other content items. Such content items may sometimes be transmitted from a content provider or another central location to one or more client devices using an electronic network such as the Internet. In some cases, the content items may be delivered to and presented by the client devices using streaming media technology. Also, in some cases, the content items may be rendered by the content provider prior to being transmitted and delivered to the client devices. An example computing environment that enables rendering and transmission of content to clients will now be described in detail. In particular, FIG. 1 illustrates an example computing environment in which the embodiments described herein may be implemented. FIG. 1 is a diagram schematically illustrating an example of a data center 210 that can provide computing resources to users 200a and 200b (which may be referred herein singularly as user 200 or in the plural as users 200) via user computers 202a and 202b (which may be referred herein singularly as computer 202 or in the plural as computers 202) via a communications network 230. Data center 210 may be configured to provide computing resources for executing applications on a permanent or an as-needed basis. The computing resources provided by data center 210 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 210 may include servers 216a and 216b (which may be referred herein singularly as server 216 or in the plural as servers 216) that provide computing resources. These resources may be available as bare metal resources or as virtual machine instances 218a-d (which may be referred herein singularly as virtual machine instance 218 or in the plural as virtual machine instances 218). Virtual machine instances 218c and 218d are input assignment virtual machine ("IAVM") instances. The IAVM's 218c and 218d may be configured to various portions of the input assignment techniques in accordance with the present disclosure and described in detail below. Also, in some cases, IAVM's 218c and 218d may be configured to store instructions for performing various input assignment techniques that may be transmitted to one or more client devices. As should be appreciated, while the particular example illustrated in FIG. 1 includes one IAVM in each server, this is merely an example. A server may include more than one IAVM or may not include any IAVM.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 1, communications network 230 may, for example, be a publicly accessible network of linked networks and possibly operated by various distinct parties, such as the Internet. In other embodiments, communications network 230 may be a private network, such as a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a gateway or web interface through which aspects of its operation may be configured through the use of a web browser application program executing on user computer 202. Alternately, a stand-alone application program executing on user computer 202 might access an application programming interface (API) exposed by data center 210 for performing the configuration operations. Other mechanisms for configuring the operation of various web services available at data center 210 might also be utilized.

Servers 216 shown in FIG. 1 may be standard servers configured appropriately for providing the computing resources described above and may provide computing resources for executing one or more web services and/or applications. In one embodiment, the computing resources may be virtual machine instances 218. In the example of virtual machine instances, each of the servers 216 may be configured to execute an instance manager 220*a* or 220*b* (which may be referred herein singularly as instance manager 220 or in the plural as instance managers 220) capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 1, a router 214 may be utilized to interconnect the servers 216*a* and 216*b*. Router 214 may also be connected to gateway 240, which is connected to communications network 230. Router 214 may be connected to one or more load balancers, and alone or in combination may manage communications within networks in data center 210, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 210 shown in FIG. 1, a server manager 215 is also employed to at least in part direct various communications to, from and/or between servers 216*a* and 216*b*. While FIG. 1 depicts router 214 positioned between gateway 240 and server manager 215, this is merely an exemplary configuration. In some cases, for example, server manager 215 may be positioned between gateway 240 and router 214. Server manager 215 may, in some cases, examine portions of incoming communications from user computers 202 to determine one or more appropriate servers 216 to receive and/or process the incoming communications. Server manager 215 may determine appropriate servers to receive and/or process the incoming communications based on factors such as an identity, location or other attributes associated with user computers 202, a nature of a task with which the communications are associated, a priority of a task with which the communications are associated, a duration of a task with which the communications are associated, a size and/or estimated resource usage of a task with which the communications are associated and many other factors. Server manager 215 may, for example, collect or otherwise have access to state information and other information associated with various tasks in order to, for example, assist in managing communications and other operations associated with such tasks.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 210 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
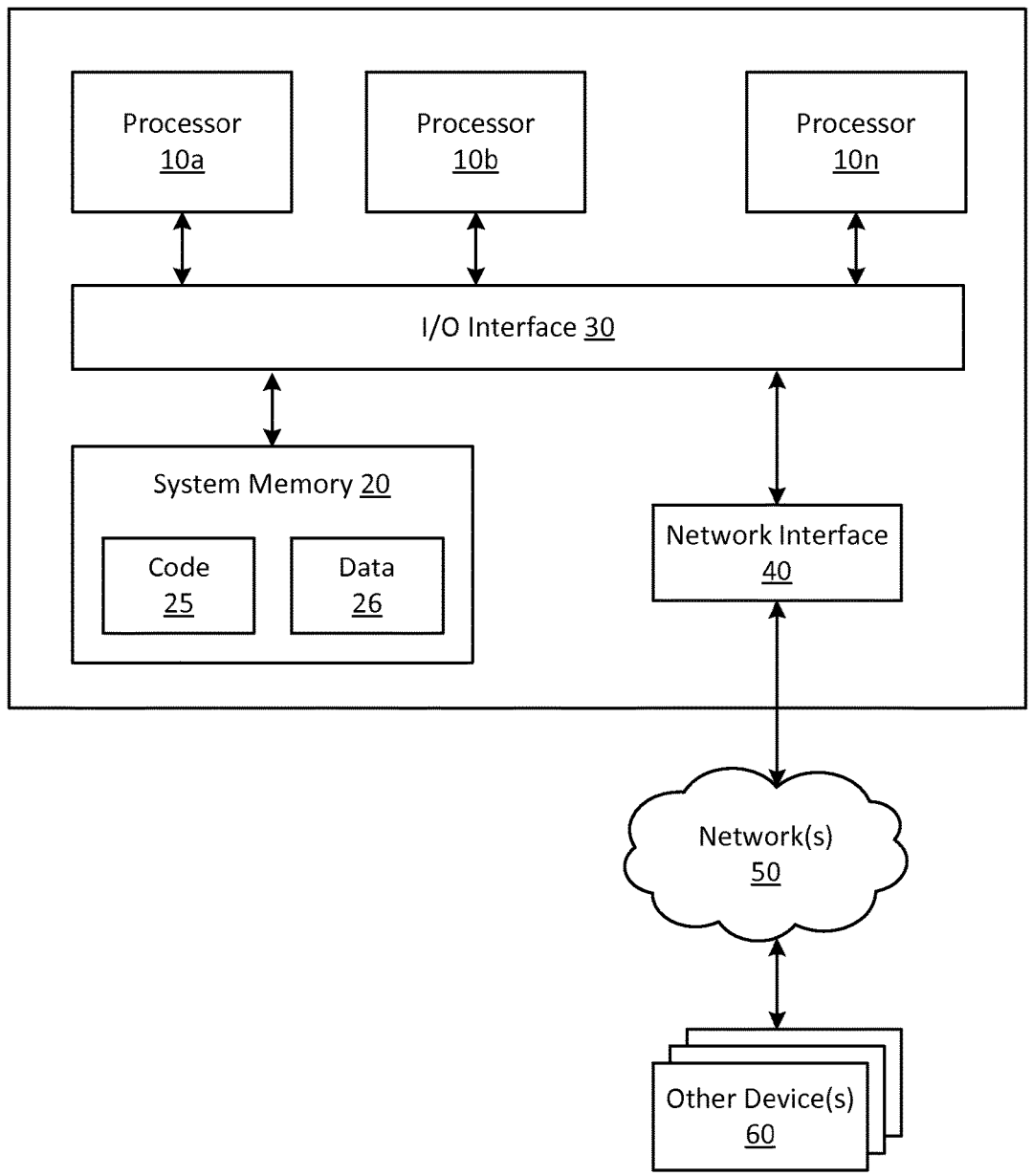
FIG. 2 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 2 depicts a general-purpose computer system that includes or is configured to access one or more computer-accessible media. In the illustrated embodiment, computing device 100 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 100 further includes a network interface 40 coupled to I/O interface 30.

In various embodiments, computing device 100 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10).

In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 100 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 100 via I/O interface 30. A non-transitory computer-accessible storage medium may also include any volatile or non-volatile media, such as RAM (e.g. SDRAM, DDR SDRAM, RDRAM, SRAM, etc.), ROM (read only memory) etc., that may be included in some embodiments of computing device 100 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 2, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients.

Figure 3:
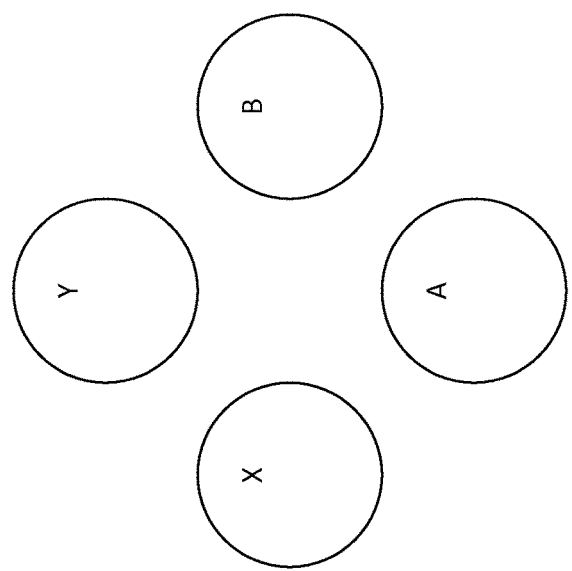
FIG. 3 is a diagram illustrating an example virtual gamepad configuration in accordance with the present disclosure.

As set forth above, in some cases, content items such as video games may receive user input through a virtual gamepad, which refers to software that provides buttons and other input controls on touchscreen devices such as smart phones and tablets. The term input control, as used herein, refers to an area of a screen that, at least temporarily, may be selected or otherwise interacted with to control a computing system. In some cases, an input control may be, for example, a displayed object such as a button, a knob, a slider, a direction wheel, a bar, an arrow, a handle and the like. Also, in some cases, an input control may be, for example, a defined screen area that does not include a displayed object. A diagram illustrating an example virtual gamepad configuration in accordance with the present disclosure is shown in FIG. 3. As shown in FIG. 3, touchscreen 300 includes input controls A, B, X and Y, which are buttons. As should be appreciated, in some cases, input controls A, B, X and Y may be displayed only temporarily or may not be displayed at all.

While FIG. 3 displays four input controls in a diamond-shaped configuration, a virtual gamepad in accordance with the disclosed techniques may include any number of input controls arranged in any appropriate configuration. Additionally, while the input controls shown in FIG. 3 are labeled with letters, an input control may be labeled with any desired identifier or, in some cases, may not be labeled with any identifier. For example, in some cases, an input control may be displayed in the shape of an arrow that suggests or indicates the function of the control (e.g., an input control shaped as an up arrow may suggest that the input control may be used for moving upwards).

In some cases, an input control may be displayed such that it appears to overlay content or other displayed information. Also, in some cases, all or various portions of an input control may be transparent or otherwise not displayed. For example, an input control may be displayed as a circle with an outer border that is visible and with the interior of the circle being transparent. As another example, an input control may be a defined area of a touchscreen that is not displayed. Furthermore, in some cases, an input control or portions of an input control may be partially transparent and/or translucent. In such cases, both the input control and content or other information that appears to be overlaid by the input control may be at least partially visible. Additionally, in some cases, an input control or portions of an input control may be displayed intermittently. In such cases, the input control may be visible at certain times, while other content or information occupying the same screen area may be displayed at other times.

As set forth above, in some cases, a content item such as a video game may be displayed on a separate device that is different from the device that provides the virtual gamepad input controls. For example, as also set forth above, a virtual gamepad may be executed on a touchscreen device that sends inputs to a video game that is displayed on a separate display device such as a television.

Additionally, in some cases, a virtual gamepad may provide input controls on the same device on which an associated content item is displayed. In some example scenarios, input controls may be displayed on a different portion of a screen from the associated content item. As an example, a content item may be displayed on a top left portion of screen, while associated input controls may be displayed on a bottom right portion of the screen. By contrast, in some other example scenarios, the input controls may be displayed on the same portion of a screen as at least a portion of an associated content item. In such cases, the input controls may sometimes appear to overlay portions of the displayed content item. In order to better display the content item, all or portions of the overlaying input controls may sometimes appear to be transparent, partially transparent, translucent and/or may be displayed intermittently as set forth above.

As described above, one problem associated with the use of virtual gamepads is that touchscreens are flat surfaces that may provide minimal, if any, tactile feedback to users. Thus, users of a virtual gamepads may have difficulty selecting intended input controls, for example, when they are not looking at the input controls. In order reduce these and other problems associated with input controls, a number of techniques for input control assignment are disclosed herein. In particular, in some cases, various techniques may be employed for assigning user inputs such as a touch on a touchscreen to various input controls such as buttons or other features provided on a touchscreen.

Figure 4:
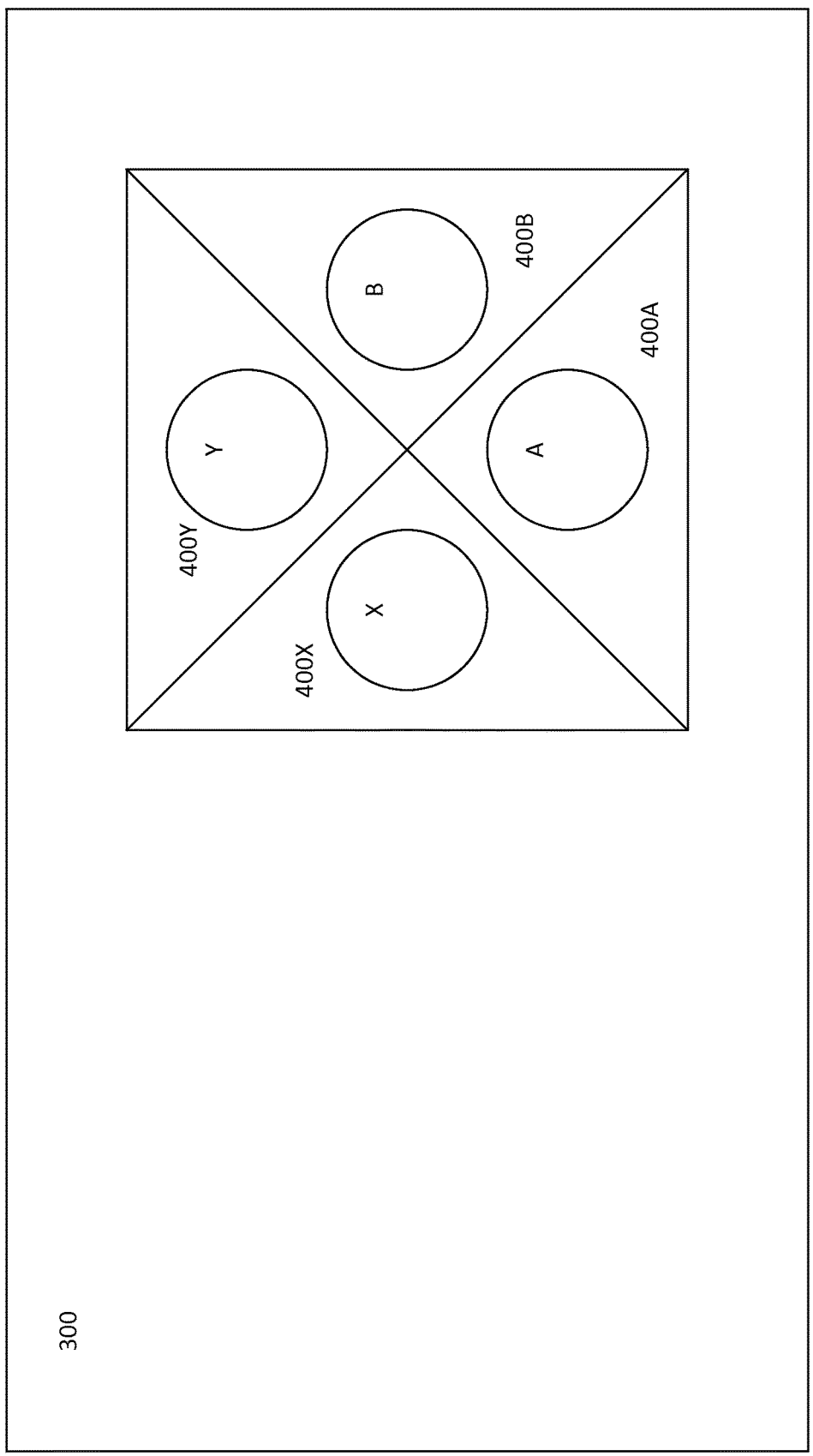
FIG. 4 is a diagram illustrating an example nearest neighbor technique configuration in accordance with the present disclosure.

One example input assignment technique disclosed herein is referred to as a nearest neighbor technique. In the nearest neighbor technique, when a user touches a screen location outside of any input control, the touch may be assigned to an input control that is positioned closest to the touch location. FIG. 4 is a diagram illustrating an example nearest neighbor technique configuration in accordance with the present disclosure. FIG. 4 shows the same four input control configuration depicted previously in FIG. 3, which includes input controls A, B, X and Y. FIG. 4 also shows four respective touch zones 400A, 400B, 400X and 400Y. In particular, a touch anywhere inside of touch zone 400A will be assigned to input control A, a touch anywhere inside of touch zone 400B will be assigned to input control B, a touch anywhere inside of touch zone 400X will be assigned to input control X and a touch anywhere inside of touch zone 400Y will be assigned to input control Y.

As shown in FIG. 4, each touch zone 400A, 400B, 400X and 400Y is configured such that any touch detected within the touch zone will be closer to its respective input control than to any other input control in an associated set of input controls (input controls A, B, X and Y form an associated set of input controls In the example of FIG. 4). In particular, touch zone 400A is configured such that a touch occurring in touch zone 400A is closer to input control A than to input controls B, X or Y. Touch zone 400B is configured such that a touch occurring in touch zone 400B is closer to input control B than to input controls A, X or Y. Touch zone 400X is configured such that a touch occurring in touch zone 400X is closer to input control X than to input controls A, B or Y. Touch zone 400Y is configured such that a touch occurring in touch zone 400Y is closer to input control Y than to input controls A, B or X.

As should be appreciated, touch zones 400A, 400B, 400X and 400Y are shown in FIG. 4 for descriptive purposes and need not necessarily be displayed on an actual touchscreen. A detected touch that is outside of touch zones 400A, 400B, 400X and 400Y may, for example, be ignored or may possibly be assigned to other input controls not shown in FIG. 4. While example touch zones 400A, 400B, 400X and 400Y have equal sizes, there is no requirement that all touch zones employed in accordance with a set of input controls must necessarily be of equal sizes. For example, if an input control is positioned at the immediate edge of a touchscreen, then its corresponding touch zone may be effectively "cut-off" by the edge of the touchscreen and may be smaller than other touch zones for other input controls that may be positioned closer to the center of a touchscreen.

Another example input assignment technique disclosed herein is referred to as an angle and distance technique. As set forth above, in the angle and distance technique, angle and distance information may be maintained for one or more associated input controls on a virtual gamepad. More specifically, for one or more specified angles or range of angles, the maintained information may indicate various distance ranges. For example, a distance range corresponding to a first input control may indicate a range within which it assumed that a user touch is intended for the first input control, while a distance range corresponding to a second input control may indicate a range within which it is assumed that a user touch is intended for the second input control.

Figure 5:
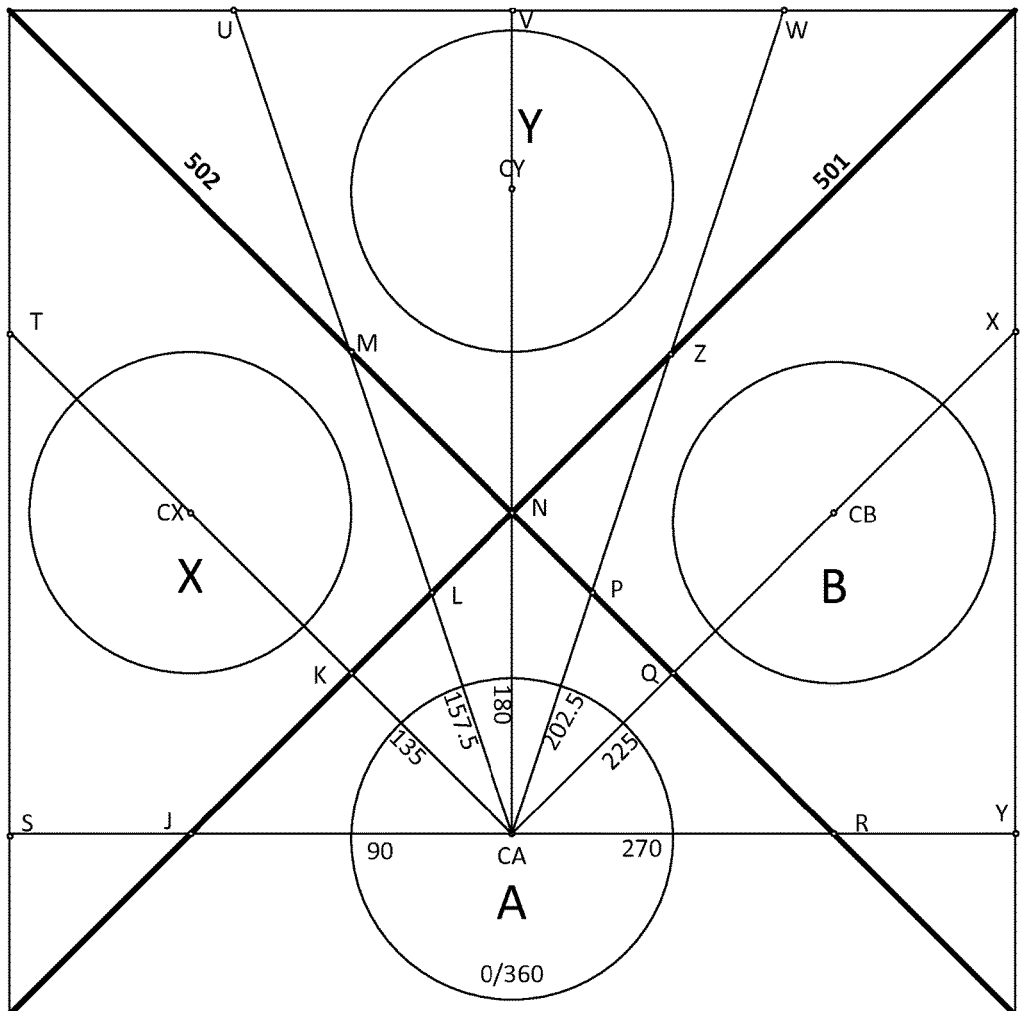
FIG. 5 is a diagram illustrating example angle and distance information in accordance with the present disclosure.

FIG. 5 is a diagram illustrating example angle and distance information in accordance with the present disclosure. In particular, FIG. 5 depicts a touchscreen portion 500 including controls A, B, X and Y. Points CA, CB, CX and CY indicate the center points of input controls A, B, X and Y, respectively. Line 501 is a straight line bisecting an area between input controls Y and B and also bisecting an area between input controls X and A. Point K represents a point on line 501 at the shortest distance between line 501 and input controls A and X. The distance between the center point of input control A and point K (i.e., distance CA-K) is equal to the distance between the center point of input control X and point K (i.e., distance CX-K). Line 502 is a straight line bisecting an area between input controls A and B and also bisecting an area between input controls X and Y. Point Q represents a point on line 502 at the shortest distance between line 501 and input controls A and B. The distance between the center point of input control A and point Q (i.e., distance CA-Q) is equal to the distance between the center point of input control B and point Q (i.e., distance CB-Q).

Chart 520 shows some example angle and distance information for input control A. In particular, column 521 specifies some selected angles associated with input control A. Column 522 lists input control A distance ranges, which are ranges of distances within which it is assumed that a touch is assigned to input control A. Column 523 lists input control X distance ranges, which are ranges of distances within which it is assumed that a touch is assigned to input control X. Column 524 lists input control Y distance ranges, which are ranges of distances within which it is assumed that a touch is assigned to input control Y. Column 525 lists input control B distance ranges, which are ranges of distances within which it is assumed that a touch is assigned to input control B. Angle and distance information such as the information shown in chart 520 may, for example, be stored in memory of a touchscreen device and/or any number of other devices.

It is noted that the distance ranges shown in chart 520 represent a range of distances in relation to points shown in FIG. 5. For example, distance range 0 to CA-J represents a range of distances from zero to distance CA-J (i.e., the distance between point CA and point J). As another example, the distance range CA-J to CA-S represents a range of distances from distance CA-J (i.e., the distance between point CA and point J) to distance CA-S (i.e., the distance between point CA and point S). The distance ranges are expressed in this manner in chart 520 merely for descriptive purposes to clarify, to a reader of this disclosure, the distances in relation to points shown in FIG. 5. In practice, the distance information stored by an actual touchscreen device may, in some cases, include actual numeric values expressed in units such as inches or millimeters and the like. Moreover, it is noted that the points and lines sown in FIG. 5 are displayed for descriptive purposes to readers of this disclosure and need not necessarily be displayed by an actual touchscreen device.

Chart 520 only specifies seven example angles shown in the seven rows of the chart. However, as should be appreciated, chart 520 may, in some cases, constitute a less than complete portion of the total angle and distance information that is maintained for input control A. In some cases, distance ranges may be specified for fewer or additional angles, fractions of angles and/or ranges of angles not shown in chart 520. While each row of example chart 520 indicates distance ranges for a single angle, distance ranges may also be indicated for ranges of multiple angles. For example, distance ranges could be indicated for angle ranges such as 90-134 degrees, 135-179 degrees, 180-224 degrees and 225-179 degrees. Additionally, it is noted that example chart 520 is arranged with angle column 521 as a key column, with the values in the remaining columns 522-525 being dependent upon the value in angle column 521. However, chart 520 is merely an example arrangement. Angle and distance information in accordance with the disclosed techniques may be arranged in a variety of other appropriate manners. For example, in another arrangement, distance ranges could be used as a key column, with the values in an angle column and/or other columns being dependent upon the distance range key column. Moreover, there is no requirement that angle and distance information be specified in a chart, table and/or relational format. Rather, angle and distance information may be specified and maintained in any appropriate format.

In the particular example of FIG. 5, the distance ranges in chart 520 are based, at least in part, upon bisecting lines 501 and/or 502. However, there is no requirement that distance ranges begin and/or end at points that are equidistant to the center points of different input controls. For example, in an alternative configuration, each input control a distance range may extend to an end point (i.e., furthest distance) that is not equidistant from both point CA and point CX, CY or CB.

More specifically, in some cases, the input control A distance ranges may be set such that they extend to end points that are closer to input control A than to other input controls (in this case, input controls B, X and Y), while, in other cases, the input control A threshold distances may be set such that they extend to end points that are further from input control A than from other input controls. For example, in one example arrangement, for angles less than 180 degrees, the input control A distance ranges may be set such that they extend to end points that are closer to point CA than to point CX, while, for angles greater than 180 degrees, the input control A distance ranges may be set such that they extend to end points that are further from point CA than from point CB.

In another example arrangement, for angles between 90 degrees and 135 degrees, the input control A distance ranges may be set such that they extend to end points that are closer to point CA than to point CX. By contrast, for angles between 135 degrees and 180 degrees, the input control A distance ranges may be set such that they extend to end points that are further from point CA than from point CX.

In the particular example of chart 520, each of the distance ranges begins and/or ends at a distance that borders another distance range. For example, the distance range 0 to CA-J ends at distance CA-J, while the distance range CA-J to CA-S begins at distance CA-J. It is noted that the beginning and/or end of each distance range is not necessarily meant to include an exact precise distance. For example, in practice, the distance range 0 to CA-J may end at a distance that is very slightly less than distance CA-J, while distance range CA-J to CA-S may begin at a distance that is very slightly greater than distance CA-J.

Additionally, there is no requirement that each distance range must be configured such that it begins or ends at a distance that borders or is close to bordering another distance range. For example, in some cases, there may be a gap between the start point of each input control X distance range and a respective endpoint of an input control A distance range. A gap between two distance ranges may include any desired size or shape. In some cases, a gap between two input control distance ranges may be defined as its own respective gap distance range. For example a gap distance range may start at the end of an input control A distance range and end at the start of an input control X distance range. In some cases, it may be assumed that touches occurring within a gap distance range are not intended for any input control. Thus, in some cases, touches occurring within a gap distance range may be ignored such that they are not assigned to any input control.

Thus, as set forth above, angle and distance information may be maintained for one or more input controls on a virtual gamepad. As also set forth above, the angle and distance information may indicate respective distance ranges associated with various angles or ranges of angles. Some example techniques for using the maintained angle and distance information to assign a user input to an input control will now be described in detail. In particular, as set forth above, in some example implementations of the angle and distance techniques, a first touch may be detected at a first screen location and assigned to a first input control. An indication of the first screen location and an indication of the assignment of the first touch to the first input control may be at least temporarily maintained. A second touch may then be detected at a second screen location. Upon detection of the second touch, both an angle and a distance may be calculated for the second screen location relative to the first screen location. One or more distance ranges associated with the calculated angle may then be identified, for example, based on maintained angle and distance information. It may then be determined which of the identified distance ranges includes the calculated distance. If, for example, the calculated distance is within a distance range corresponding to the first input control, then the user touch may be assigned to the first input control. If, for example, the calculated distance is within a distance range corresponding to a second input control, then the user touch may be assigned to the second input control.

Figure 6:
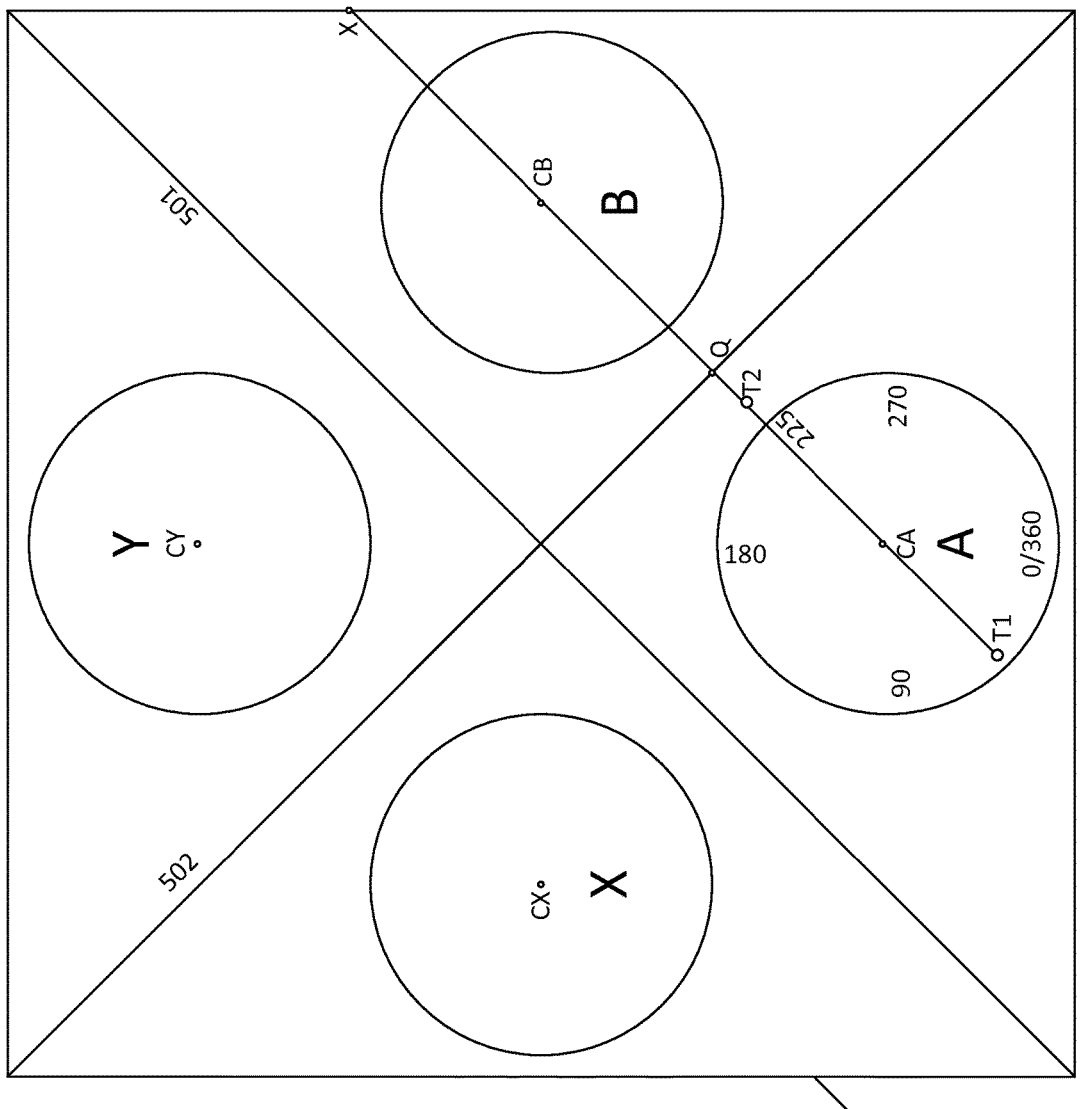
FIG. 6 is a diagram illustrating a first example angle and distance technique scenario in accordance with the present disclosure.

Some example scenarios illustrating the above described example angle and distance application techniques will now be set forth in detail. In particular, FIG. 6 is a diagram illustrating a first example angle and distance technique scenario in accordance with the present disclosure. As shown in FIG. 6, a first touch is detected at a first screen location (point T1 in FIG. 6) within the boundaries of input control A. As shown in FIG. 6, the first screen location T1 is positioned within a lower-left portion of input control A. Because the first screen location T1 is located inside of input control A, the first touch may be assigned to input control A. An indication of the first screen location T1 and an indication of the assignment of the first touch to input control A may be at least temporarily maintained. The first screen location T1 may be indicated based on, for example, coordinate values or any other appropriate value that is capable of indicating a location.

Subsequent to the detection of the first touch, a second touch is detected at a second screen location (point T2 in FIG. 6). As set forth above, when using the angle and distance technique, the input control to which to assign the second touch may be determined based on an angle and distance of the second screen location T2 relative to the first screen location T1. In greater detail, as shown in FIG. 6, the second screen location T2 is positioned at a 225 degree angle relative to the first screen location T1. The distance between the first screen location T1 and the second screen location T2 may also be calculated. For purposes of simplicity to the reader, the distance between the first screen location T1 and the second screen location T2 is represented herein by the following notation: distance T1-T2. As should be appreciated, in practice, this distance may be calculated as an actual numeric value expressed in units such as inches or millimeters and the like.

Upon calculation of the angle and distance of the second screen location T2 relative to the first screen location T1, the calculated angle and distance may be compared to maintained angle and distance information. In particular, because the first touch was previously assigned to the input control A, the calculated angle and distance are compared to angle and distance information associated with input control A. Referring back to FIG. 5, example angle and distance information associated with input control A is depicted in chart 520 of FIG. 5. In greater detail, the calculated angle of 225 degrees may be used as a reference value to find a matching value in angle column 521 of chart 520. As shown in FIG. 5, the value of 225 degrees is specified in the sixth row of the chart 520. As also shown in FIG. 5, the sixth row of chart 520 indicates that the angle of 225 degrees is associated with a respective input control A distance range 0 to CA-Q and a respective input control B distance range CA-Q to CA-X.

Accordingly, based on information extracted from chart 520, it may be determined that the second touch may be assigned to input control A if the distance T1-T2 is within distance range 0 to CA-Q. By contrast, the second touch may be assigned to input control B if the distance T1-T2 is within the distance range CA-Q to CA-X. Referring back to FIG. 6, box 600 indicates that the distance T1-T2 is included within distance range CA-Q to CA-X. This can be observed in FIG. 6 by, for example, determining that distance T1-T2 is greater than the distance CA-Q (i.e., the distance between point CA and point Q) and less than the distance CA-X (i.e., the distance between point CA and point X). Thus, because the calculated distance T1-T2 is included in distance range CA-Q to CA-X, the second touch is assigned to input control B. As should be appreciated, box 600 is depicted in FIG. 6 merely for informational purposes to the reader of this disclosure and there is no requirement that any such box need be displayed by any device employing the disclosed techniques.

As may be ascertained from the example shown in FIG. 6, the use of the disclosed angle and distance techniques may sometimes result in a different input control assignment as compared to other example input control assignment techniques. For example, if a nearest neighbor technique were to be employed for the example of FIG. 6, then this may result in the second touch being assigned to input control A. This is because, as illustrated in FIG. 6, the second screen location T2 is closer to input control A than to any of the other input controls B, X or Y.

Figure 7:
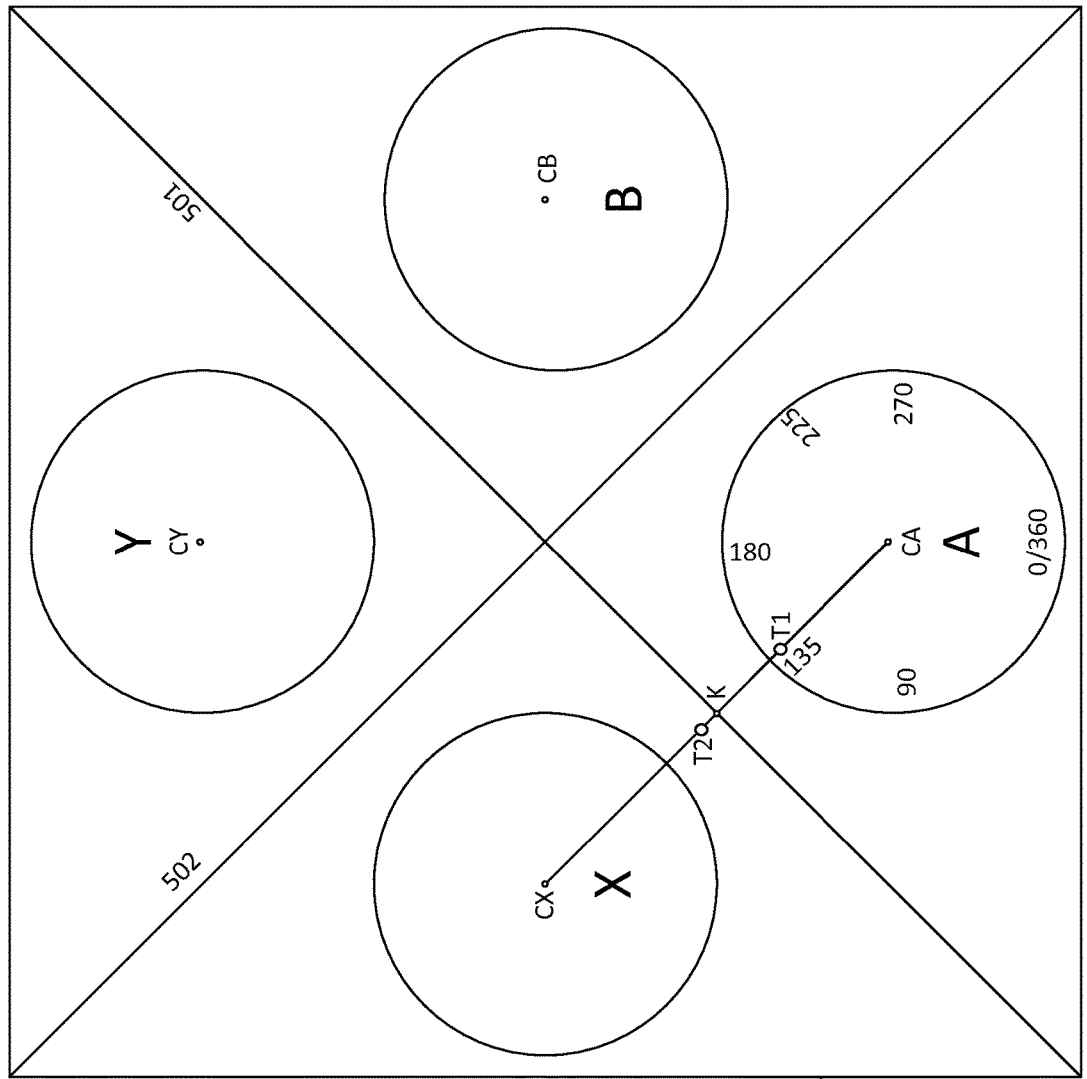
FIG. 7 is a diagram illustrating a second example angle and distance technique scenario in accordance with the present disclosure.

Thus, FIG. 6 depicts a first example angle and distance technique scenario in which a first touch and a second touch are assigned to different input controls. A second example angle and distance technique scenario in accordance with the present disclosure will now be described with reference to FIG. 7. In the example, of FIG. 7, the first touch and the second touch will be assigned to the same input control. In particular, as shown in FIG. 7, a first touch is detected at a first screen location (point T1 in FIG. 7) within the boundaries of input control A. As shown in FIG. 7, the first screen location T1 is positioned within an upper-left portion of input control A. Because the first screen location T1 is located inside of input control A, the first touch may be assigned to input control A. An indication of the first screen location T1 and an indication of the assignment of the first touch to input control A may be at least temporarily maintained. The first screen location T1 may be indicated based on, for example, coordinate values or any other appropriate value that is capable of indicating a location.

Subsequent to the detection of the first touch, a second touch is detected at a second screen location (point T2 in FIG. 7). As set forth above, when using the angle and distance technique, the input control to which to assign the second touch may be determined based on an angle and distance of the second screen location T2 relative to the first screen location T1. In greater detail, as shown in FIG. 7, the second screen location T2 is positioned at a 135 degree angle relative to the first screen location T1. The distance between the first screen location T1 and the second screen location T2 (indicated herein as distance T1-T2) may also be calculated. It is once again noted that, in practice, this distance may be calculated as an actual numeric value expressed in units such as inches or millimeters and the like.

Upon calculation of the angle and distance of the second screen location T2 relative to the first screen location T1, the calculated angle and distance may be compared to maintained angle and distance information. In particular, because the first touch was previously assigned to the input control A, the calculated angle and distance are compared to angle and distance information associated with input control A. Referring back to FIG. 5, example angle and distance information associated with input control A is depicted in chart 520 of FIG. 5. In greater detail, the calculated angle of 135 degrees may be used as a reference value to find a matching value in angle column 521 of chart 520. As shown in FIG. 5, the value of 135 degrees is specified in the second row of the chart 520. As also shown in FIG. 5, the second row of chart 520 indicates that the angle of 135 degrees is associated with a respective input control A distance range 0 to CA-K and a respective input control X distance range CA-K to CA-T.

Accordingly, based on information extracted from chart 520, it may be determined that the second touch may be assigned to input control A if the distance T1-T2 is within the distance range 0 to CA-K. By contrast, the second touch may be assigned to input control X if the distance T1-T2 is within the distance range CA-K to CA-T. Referring back to FIG. 7, box 700 indicates that the distance T1-T2 is included within distance range 0 to CA-K. This can be observed in FIG. 6 by, for example, determining that distance T1-T2 is greater than zero and less than the distance CA-K (i.e., the distance from point CA to point K). Thus, because the calculated distance T1-T2 is within the distance range 0 to CA-K, the second touch is assigned to input control A. As should be appreciated, box 700 is depicted in FIG. 7 merely for informational purposes to the reader of this disclosure and there is no requirement that any such box need be displayed by any device employing the disclosed techniques.

As was the case in FIG. 6, the use of the angle and distance technique in FIG. 7 may result in a different input control assignment as compared to the use of the nearest neighbor technique. For example, if the nearest neighbor technique were to be employed for the example of FIG. 6, then this may result in the second touch being assigned to input control X. This is because, as illustrated in FIG. 7, the second screen location T2 is closer to input control X than to any of the other input controls A, B or Y. It is noted, however, that while the angle and distance technique and the nearest neighbor technique lead to different outcomes in both the examples of FIGS. 6 and 7, there may be many other example scenarios in which the angle and distance technique and the nearest neighbor technique may lead to identical outcomes.

In the particular examples depicted in FIGS. 6 and 7, the first screen location T1 is positioned within the boundaries of input control A. However, there may be some scenarios in which a first touch is detected in an area outside of the boundaries of any input control. In these scenarios, the first touch may be assigned to a respective input control using any desired technique. As an example, in some cases, the first touch may be assigned based on the nearest neighbor technique described above, in which the first touch may be assigned to an input control that is positioned closest to the first screen location. Other appropriate techniques may also be employed.

Additionally, while the particular examples depicted in FIGS. 6 and 7 depict only two touches (detected respectively at first screen location T1 and second screen location T2), the angle and distance techniques disclosed herein may be persisted over any number of subsequent touches. For example, a third touch may be detected at a third screen location, and the third touch may then be assigned to an input control based on an angle and distance of the third screen location relative to the second screen location T2. Moreover, a fourth touch may be detected at a fourth screen location, and the fourth touch may then be assigned to an input control based on an angle and distance of the fourth screen location relative to the third screen location. Thus, the angle and distance technique may, in some cases, result in a cycle of assigning subsequent touches to input controls based on their position relative to prior touches.

In some cases, however, certain conditions may arise that may cause the above described assignment cycle to be reset. These conditions are referred to herein as reset conditions. To illustrate the concept of a reset condition, consider an example scenario in which a reset condition is detected subsequent to detection of a third touch but prior to the detection of a fourth touch. In this example scenario, the fourth touch would be assigned to an input control irrespective of an angle and distance of the fourth screen location relative to the third screen location. Rather, the fourth touch may instead be assigned to an input control based on another technique such as a nearest neighbor technique. After assignment of the fourth touch, the assignment cycle may then be resumed. For example, a fifth touch may be detected at a fifth screen location and assigned to an input control based on an angle and distance of the fifth screen location relative to the fourth screen location.

A variety of different reset conditions may be employed in accordance with the disclosed techniques. In some cases, a reset condition may include events such as an extended time lapse after detection of a prior touch without detection of a subsequent touch. For example, in some cases, a counting of a threshold time period may be started upon a detection of a prior touch. If an expiration of the threshold time period is reached prior to a detection of a subsequent touch, then an extended time lapse may be detected. Such an extended time lapse between touches may, in some cases, suggest that the user has had an opportunity to look down from a separate display device to a virtual gamepad device that the user is holding in his or her hands. Also, when a content item is being displayed on the same device that provides a virtual gamepad, an extended time lapse may, in some cases, suggest that the user has had an opportunity to shift his or her focus to a portion of the touchscreen on which input controls may be provided. In addition to time lapses, certain events or actions occurring within the context of a video game or other content item may also trigger a reset condition. For example, in some cases, a stop, pause or loading condition associated with a played content item may constitute a reset condition. Also, in some cases, a break or decrease in a level of action associated with a played content item may constitute a reset condition. Additionally, in some cases, attaining a particular level, goal, object, scene or character designation associated with a played content item may constitute a reset condition.

Some other example reset conditions may include a detection of a touch that is beyond any distance range that corresponds to any input control. Also, in some cases, a reset condition may include a detection of a touch in an area of a screen that includes a different set of input controls. For example, in some cases, a right side of a touchscreen may display input controls A, B, X and Y such as those shown in FIGS. 3-8, while a left side of the touchscreen may display left arrow and right arrow buttons. In one example scenario, a first touch may be detected on input control A, and then a second touch may subsequently be detected on the left arrow button. In this scenario, the detection of the second touch on the left arrow button may constitute a reset condition with respect to input controls A, B, X and Y.

In some cases, a reset condition may be triggered based on certain user commands or actions. For example, in some cases, a reset button may be displayed on the virtual gamepad, and a reset condition may occur when a touch is detected on the reset button. Also, in some cases, a particular reset gesture such as shaking of the virtual gamepad may be defined, and a reset condition may occur when the reset gesture is detected. Furthermore, an audible spoken command such as the word reset may be used to trigger a reset condition. Additionally, in some cases, a camera may be employed to track where user's eyes are directed, and a reset condition may occur, for example, when it is determined that a user has looked down or otherwise focused on one or more input controls.

Furthermore, in some cases, a reset condition may be triggered based on excessive drift. As an example, excessive drift may occur, in some cases, when a location of a particular touch is excessively distant from a location of an input control to which the touch may otherwise be assigned. One example scenario in which excessive drift may sometimes occur is when multiple consecutive touches are assigned to the same input control and continue to extend outward from the assigned input control. A number of techniques may be employed in order to determine when an amount of drift has become excessive. In some cases, drift may be determined to be excessive based on a threshold drift distance from a particular input control. In greater detail, when a touch is detected at location that exceeds the threshold drift distance from an input control to which the touch would otherwise be assigned, then a reset condition may occur.

Figure 8:
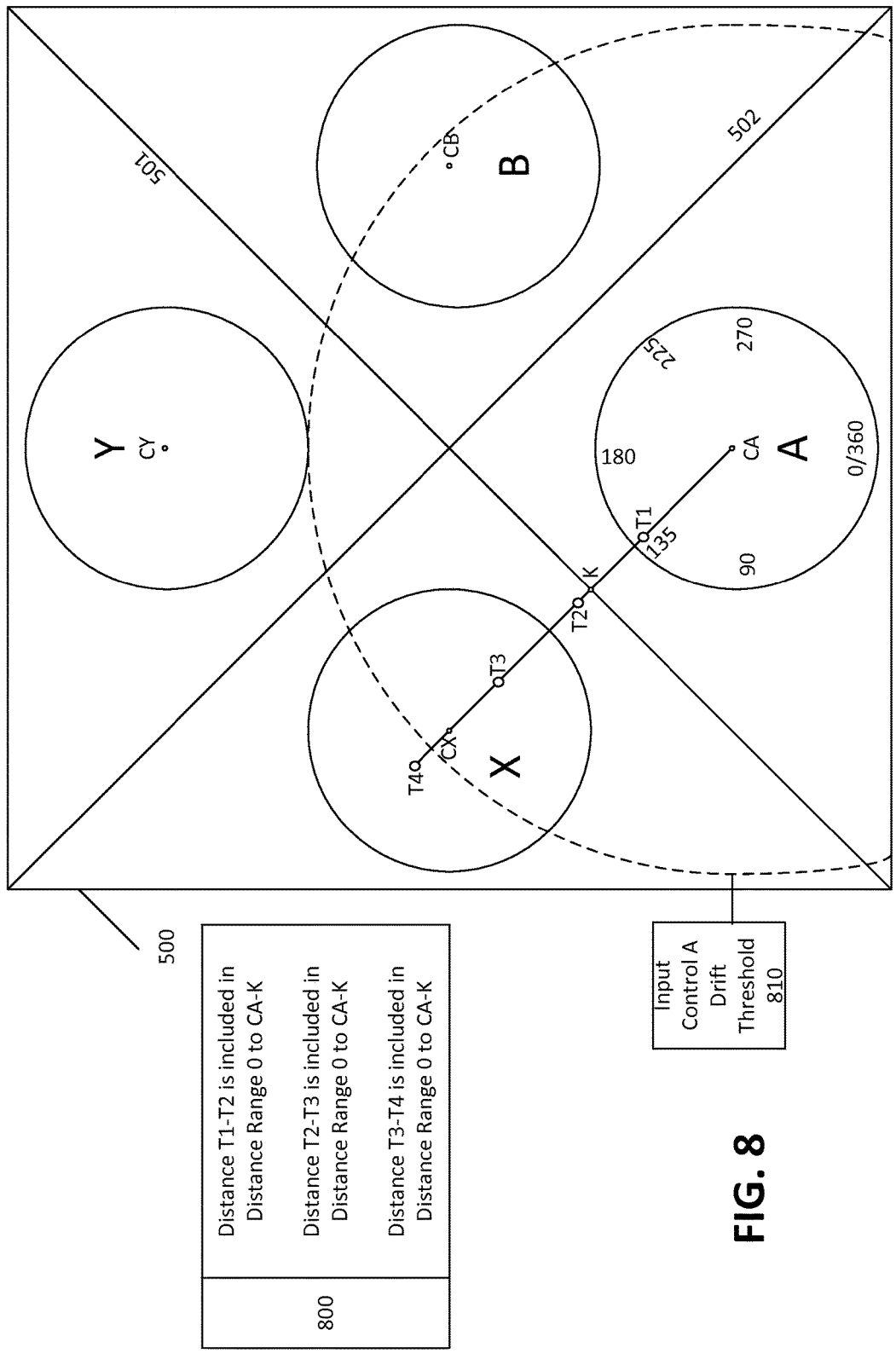
FIG. 8 is a diagram illustrating an example excessive drift scenario in accordance with the present disclosure.

FIG. 8 is a diagram illustrating an example excessive drift scenario in accordance with the present disclosure. As shown in FIG. 8, input control A drift threshold 810 (represented as a dashed line to be more apparent to the reader) represents a threshold distance beyond which excessive drift may be determined to occur in relation to input control A. FIG. 8 also depicts four touches detected at four respective screen locations. In particular, a first touch is detected at a first screen location T1, a second touch is detected at a second screen location T2, a third touch is detected at a third screen location T3 and a fourth touch is detected at a fourth screen location T4. For purposes of simplicity, each touch is detected to be at a 135 degree angle with respect to the previous touch. The first touch is assigned to input control A based on the position of the first screen location T1 being inside of input control A. Referring back to FIG. 5, chart 520 of FIG. 5 indicates that, for input control A, the angle of 135 degrees is associated with a respective input control A distance range 0 to CA-K. Thus, touches subsequent to the first touch will continue to be assigned to input control A provided that their calculated distance relative to the prior touch is within distance range 0 to CA-K. As shown in box 800, the calculated distance between each of the first three successive touches (i.e., distance T1-T2, distance T2-T3 and distance T3-T4) are each determined to be within the distance range 0 to CA-K. Accordingly, the first, second and third touches are each assigned to input control A.

It is noted, however, that the fourth screen location T4 is positioned beyond input control A drift threshold 810 with respect to input control A. Thus, the fourth touch may be determined to constitute an excessive amount of drift with respect to input control A. As set forth above, in some cases, an excessive amount of drift may constitute a reset condition. In these cases, the assignment cycle of the four touches depicted in FIG. 8 may be reset such that the fourth touch is assigned irrespective of the angle and distance of the fourth screen location relative to the third screen location. Accordingly, in some cases, rather than being assigned to input control A, the fourth touch may instead be assigned to input control X based on the position of the fourth screen location T4 being inside of input control X.

While the input control A drift threshold depicted in FIG. 8 applies to input control A, some drift thresholds may be configured such that they apply to multiple input controls and/or to a set of input controls. There is no requirement that all drift thresholds in accordance with the disclosed techniques be of any particular shape or extend around all or any particular angles or ranges angles relative to an input control. For example, in some cases, a drift threshold may not extend all the way around an input control. In some cases, a drift threshold may be provided for touches extending from the top of an input control but may not be provided for touches extending from the bottom, left or right of an input control. Also, in some cases, drift thresholds may extend further away from a respective input control at some angles than at other angles with respect to the input control. For example, if a right-side portion of an input control is positioned close to a right edge of a touchscreen, then, in some cases, a drift threshold for the input control may extend less far on the right side of the input control than on the left side of the input control. In some cases, a drift threshold may be effectively cut-off by an edge of the touchscreen at certain sides and/or with respect to an input control.

Even when a particular input control is not close to an edge of the touchscreen, the input control's drift threshold may nevertheless be cut-off when other neighboring or associated input controls are positioned close to an edge of the touchscreen. In addition to an edge of the touchscreen, other factors may also influence the size, shape or configuration of a drift threshold. For example, a drift threshold may be configured to prevent drift into areas of a touchscreen that include other sets of input controls. For example, as set forth above, in some cases, a right side of a touchscreen may display input controls A, B, X and Y such as those shown in FIGS. 3-8, while a left side of the touchscreen may display left arrow and right arrow buttons. In these cases, one or more drift thresholds for the A, B, X and/or Y buttons may be configured to prevent drift towards the arrow buttons on the left side of the touchscreen.

Thus, as set forth above, excessive drift and/or a variety of other different actions or events may trigger a reset condition. As also set forth above, the reset condition may, in some cases, reset an assignment cycle such that a subsequent touch is assigned irrespective of its angle and distance relative to a previous touch. In addition to resetting the assignment cycle, the detection of a reset condition may also, in some cases, trigger various feedback operations to be performed in order to inform a user that a reset condition has occurred. For example, in some cases, a reset condition may be indicated to a user via an audible indication such as a tone or other sound or via a visual indication such as a temporary icon that is displayed within the display of a video game or other content item.

Figure 9:
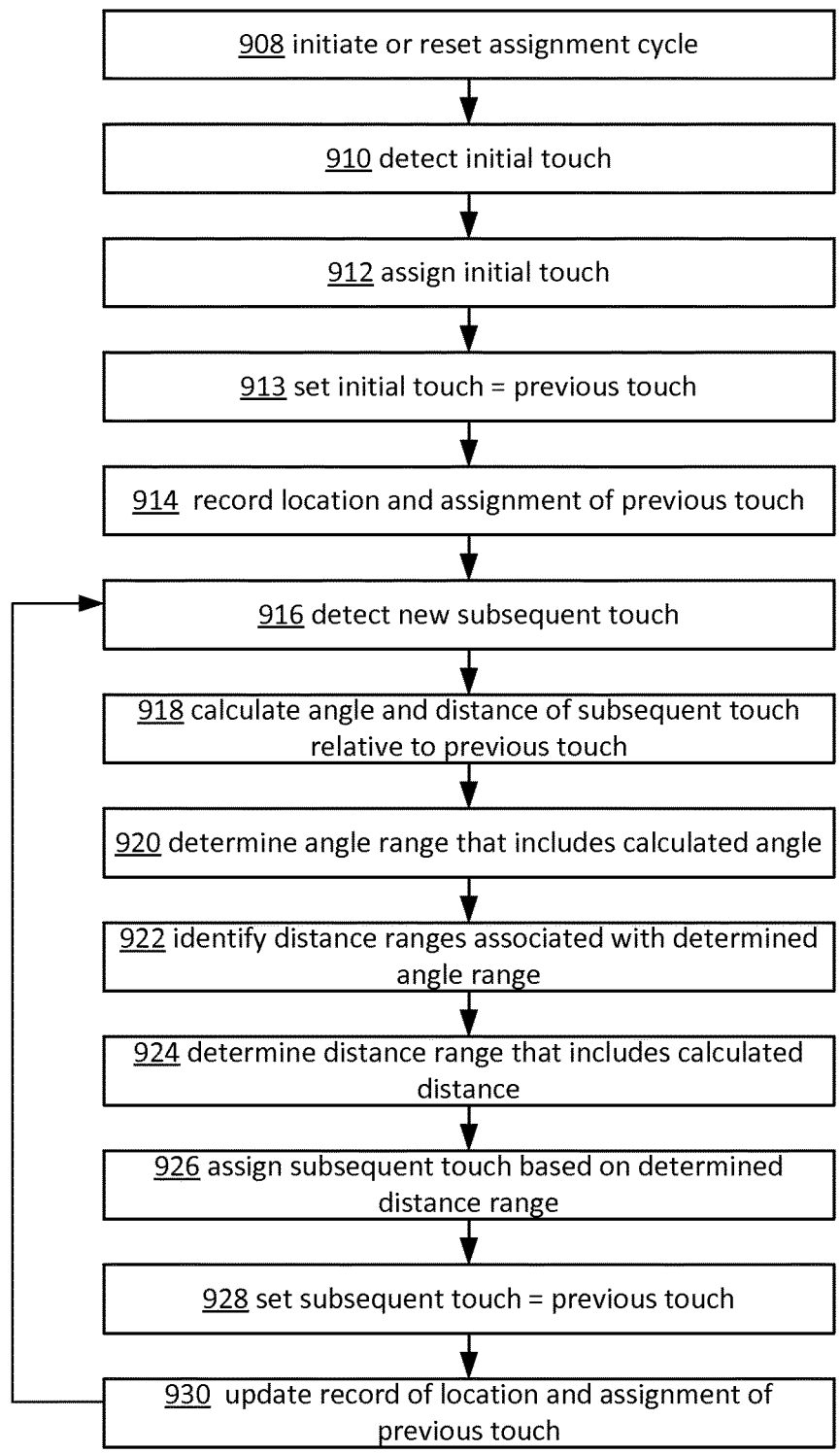
FIG. 9 is a flowchart depicting an example angle and distance technique procedure in accordance with the present disclosure.

Thus, a number of example scenarios in which angle and distance techniques may be employed are set forth in detail above. Some example procedures for performing the disclosed angle and distance techniques will now be described in detail. In particular, FIG. 9 is a flowchart depicting an example angle and distance technique procedure in accordance with the present disclosure. At operation 908, an assignment cycle for the angle and distance techniques is initiated or reset. A set forth above, an assignment cycle refers to the process of assigning a subsequent touch to an input control based an angle and distance of the subsequent touch in relation to a previous touch. As an example, in some cases, an assignment cycle may be initiated when certain input controls are first displayed on a touchscreen or at the initiation of certain video games or other content items. A reset of an assignment cycle may be triggered, for example, by the detection of a reset condition. Reset conditions are described in detail above and may include, for example, a determination of excessive drift, activation of a reset button, performance of a reset gesture or other reset command, an extended time lapse without detection of any new touches, and many others.

At operation 910, an initial touch is detected on a touchscreen of a device that provides input controls such as those shown in FIGS. 3-8. For example, referring back to the scenario depicted in FIG. 8, an example of operation 910 may include detecting a first touch at the first screen location T1 as depicted in FIG. 8. In some cases, the initial touch may be a first touch that occurs after initiating or resetting of an assignment cycle. Also, in some cases, an initial touch may be a touch that triggers a reset condition to occur. For example, as described above, when a detected touch triggers an excessive drift determination, then a reset condition may occur. In some cases, the touch that triggered the excessive drift determination may then be considered to be an initial touch (thus, operation 910 may sometimes be effectively performed prior to operation 908 in these scenarios).

At operation 912, the initial touch is assigned to an input control. For example, referring back to the scenario depicted in FIG. 8, an example of operation 912 may include assigning the first touch to input control A of FIG. 8. In some cases, such as depicted for T1 in FIG. 8, the initial touch may be detected at a location that is within the boundaries of an input control. In these cases, the initial touch may, for example, be assigned to the input control within which the touch is detected. In other cases, the initial touch may be detected at a location that is not within the boundaries of any input control. In these scenarios, any appropriate desired technique may be employed to assign the initial touch to an input control. One such technique is the nearest neighbor technique, which is described in detail above with reference to FIG. 4.

At operation 913, the initial touch is set to be a previous touch for purposes of input control assignment. Upon performance of operation 913, the initial touch is referred to in following operations as the previous touch.

At operation 914, the assignment and location of the previous touch are recorded. For example, referring back to the scenario depicted in FIG. 8, operation 914 may include recording an indication of the first screen location T1 and an indication of the assignment of the first touch to input control A. As an example, these indications may be recorded in any suitable accessible memory storage location.

At operation 916, a new subsequent touch is detected on the touchscreen. For example, referring back to the scenario depicted in FIG. 8, the first iteration of operation 916 may include detecting a second touch at the second screen location T2 of FIG. 8.

At operation 918, an angle and distance of the subsequent touch is calculated relative to the previous touch. For example, referring back to the scenario depicted in FIG. 8, operation 918 may include calculating the angle and distance of second screen location T2 relative to first screen location T1. In greater detail, as shown in FIG. 8, the second screen location T2 is positioned at a 135 degree angle relative to the first screen location T1. The distance between the first screen location T1 and the second screen location T2 is expressed as distance T1-T2. The angle and distance calculations of operation 918 may be performed, for example, by adding, subtracting or otherwise comparing various coordinate values or other values associated with the subsequent touch relative to the previous touch.

At operation 920, a range of one or more angles is determined that includes the angle calculated at operation 918. In some cases, various ranges of one or more angles may be indicated in maintained angle and distance information. These indicated ranges may, in some cases, be successively examined in any desired order until a range that includes the calculated angle is determined. For example, referring back to FIG. 5, chart 520 of depicts example angle and distance information associated with input control A. Column 521 of chart 520 indicates various angles. In some cases, values indicated in column 521 may be successively examined until a value is determined that includes or matches the calculated value of 135 degrees. As shown in chart 520, the calculated angle of 135 degrees is specified in the second row of chart 520. Thus, in the particular example of FIG. 5, the calculated angle of 135 degrees is included within an angle range of 135 degrees indicated in the second row of chart 520. As should be appreciated, the angle range of 135 degrees indicated in the second row of chart 520 consists of only a single angle. However, angle ranges indicated within angle and distance information may, in some cases, include multiple angles.

At operation 922, distance ranges associated with the determined angle range are identified. In some cases, the distance ranges may be identified based on maintained angle and distance information. For example, referring again back to FIG. 5, chart 520 indicates that the angle of 135 degrees is associated with a respective input control A distance range 0 to CA-K and a respective input control X distance range CA-K to CA-T.

At operation 924, a distance range is determined that includes the distance calculated at operation 918. In some cases, the distance ranges identified at operation 922 may be successively examined in any desired order until a distance range that includes the calculated distance is identified. For example, referring back to the scenario depicted in FIG. 8, box 800 of FIG. 8 indicates that the calculated distance T1-T2 is within the input control A distance range 0 to CA-K. Thus, for example, when distance range 0 to CA-K is examined, it may be determined that distance range 0 to CA-K includes the calculated distance T1-T2.

At operation 926, the subsequent touch is assigned based on the distance range determined at operation 924. For example, referring back to the scenario depicted in FIG. 8, because the calculated distance T1-T2 is within the input control A distance range 0 to CA-K, the second touch is assigned to input control A.

At operation 928, the subsequent touch is set to be a previous touch for purposes of input control assignment. Upon performance of operation 928, the subsequent touch is referred to in following operations as the previous touch.

At operation 930, the record of the assignment and location of the previous touch is updated to reflect the most recent iteration of the previous touch. For example, referring back to the scenario depicted in FIG. 8, the first iteration of operation 924 may include recording an indication of the second screen location T2 and an indication of the assignment of the second touch to input control A. As an example, these indications may be recorded in any suitable accessible memory storage location.

Upon performance of operation 930, the procedure loops back to operation 916, at which a new subsequent touch is detected. For example, referring back to the scenario depicted in FIG. 8, the second iteration of operation 916 may include detecting the third touch at the third screen location T3 of FIG. 8. At this point, the third touch may be designated as the subsequent touch. At the second iteration of operation 918, the angle and distance of the third screen location T3 may be calculated relative to the second screen location T2, which results in a calculated angle of 135 degrees and a calculated distance expressed as distance T2-T3. At the second iteration of operation 920, the calculated angle of 135 degrees may again be determined to be within the angle range of 135 degrees indicated in chart 520 of FIG. 5. At the second iteration of operation 922, the input control A distance range 0 to CA-K and the input control X distance range CA-X to CA-T may again be identified as associated with the angle range of 135 degrees. At the second iteration of operation 924, the distance T2-T3 may be determined to be within the input control A distance range 0 to CA-K. At the second iteration of operation 926, the third touch may be again assigned to input control A because the distance T2-T3 is within the input control A distance range 0 to CA-K. At the second iteration of operation 928, the third touch may be set to the previous touch. At the second iteration of operation 930, the record of the assignment and location of the previous touch may be updated to reflect location T3 and the assignment of the third touch to input control A. The operation may then again loop back to operation 916.

As set forth above, in some cases, a reset condition may be detected at some point during the procedure of FIG. 9. Such a reset condition may cause the procedure to loop back to operation 908, at which point the procedure may be restarted. In some cases, a determination of excessive drift may trigger a reset condition. For example, referring back to the scenario depicted in FIG. 8, the fourth touch detected at screen location T4 may be determined to constitute excessive drift if the fourth touch were to be assigned to input control A. Thus, for example, the fourth touch may be considered to trigger a reset condition, at which point the fourth touch may be re-designated as an initial touch. In addition to excessive drift, a number of other example reset conditions are described in detail above, including, for example, activation of a reset button, performance of a reset gesture or other reset command, an extended time lapse without detection of any new touches, and many others.

In some cases, all operations in the example procedure of FIG. 9 may be performed by a client device that provides the input controls. In these cases, instructions for performing the operations of FIG. 9 may sometimes be downloaded by the client from a connected server and/or content provider and may also be periodically updated via additional downloads. Also, in some cases, the operations depicted in FIG. 9 may be performed collectively by multiple devices. For example, in some cases, detected location information may be sent to a server or other local or remote connected device that may perform operations such as calculation of distances, comparison of calculated distances to threshold distances, input control assignment and others.

In some cases, angle and distance information may be set or adjusted based on various factors. One example factor may include information associated with a history of observed user interaction with various input controls, which is referred to herein as training information. For example, over time, it may be observed that the angle and distance techniques are assigning touches to a particular input control more often than expected. In such a scenario, it may sometimes be desirable to reduce the size of a distance range associated with that particular input control so that fewer touches are assigned to that particular input control. By contrast, over time, it may be observed that the angle and distance techniques are assigning touches to a particular input control less often than expected. In such a scenario, it may sometimes be desirable to increase the size of a distance range associated with that particular input control so that more touches are assigned to that particular input control.

As another example, over time, it may be observed that the angle and distance techniques are assigning touches to a particular input control on unanticipated occasions that may not make sense within the context if a user experience. For example, it may be observed that a down arrow button is being consistently selected even after users have already navigated to the bottom ends of various menus or other interfaces. In such a scenario, it may sometimes be desirable to reduce the size of a distance range associated with that down arrow button so that fewer touches are assigned to the down arrow button. Also, in some cases, a drift threshold distance associated with the down arrow button could be reduced such that fewer repeated touches are assigned to the down arrow button.

As yet another example, it may be observed that the angle and distance techniques are assigning touches to a gap distance range between two input control distance ranges more often than expected. In such a scenario, it may sometimes be desirable to eliminate or reduce the size of the gap distance range such that more touches are assigned to input controls on one or both sides of the gap distance range.

Any or all of the distance range adjustments described above, may be made across any combination of one or more different angles and/or ranges of angles with respect to one or more particular input controls. Furthermore, in addition to setting or adjusting of distance ranges, one or more ranges of angles may also be set or adjusted based on various factors. For example, consider the scenario in which angle and distance information originally specifies various threshold distances for an angle range of 90-109 degrees with respect to a particular input control. Suppose that, over time, it is determined that user touches from 90-99 degrees are consistently detected at drastically different distance ranges in comparison to user touches from 100-109 degrees. In such a scenario, it may sometimes be desirable to divide the original angle range of 99-109 into two different ranges (for example, 90-99 degrees and 100-109 degrees) such that different distance ranges may be associated with 90-99 degrees in comparison 100-109 degrees.

In some cases, data associated with physical, demographic and other characteristics associated with various users may be collected. For example, information may be collected associated with user characteristics such as ages, genders, hand sizes, finger sizes, palm sizes and many others. For example, users may have their hand sizes measured by a touchscreen device and/or may provide information via a questionnaire provided by a touchscreen device or other appropriate technique. This collected information may then be used to set or adjust angle and distance information. For example, in some cases, it may be determined that an increased amount of children and younger users have recently begun to interact with a particular set of input controls. In such cases, it may be assumed that children and younger users tend to have smaller hand sizes than older users. In these scenarios, it may sometimes be desirable to adjust various distance ranges to account for smaller hand sizes. For example, in some cases, angle and distance information for a particular input control may be adjusted by decreasing a size of a distance range surrounding the particular input control.

In addition to setting and adjusting of angle and distance information, the locations of various input controls may also be set or adjusted in response to various factors. For example, if it is determined that certain input controls are being used by younger players with smaller hands, then, in some cases, the locations of the input controls may be adjusted such that the input controls are positioned closer together. By contrast, if it is determined that certain input controls are being used by older players with larger hands, then, in some cases, the locations of the input controls may be adjusted such that the input controls are positioned further apart.

In some cases, information associated with physical attributes and demographics of users, information associated with the frequency and/or context of assignment of touches to various input controls and any other information may be collected by various client touchscreen devices and sent via an electronic network to one or more servers and/or content providers. The servers and/or content providers may, for example, aggregate information collected from different client touchscreen devices and use the aggregated information to make or assist in making various determinations about setting or adjusting angle and distance information and/or input control locations. In some cases, these determinations may be transmitted back to various client touchscreen devices, which may then implement the various determinations. Also, in some cases, logic may be provided on a client touchscreen device to make various determinations about setting or adjusting angle and distance information and/or input control locations based on information collected by the device itself and/or other devices.

In some cases, various information associated with input controls and input assignment techniques may be stored in a user profile associated with one or more users. For example, in some cases, a particular user may choose to set or adjust various angle ranges and/or distance ranges specified within the angle and distance information such that input assignment is performed efficiently for the particular user. Additionally, in some cases, a particular user may arrange or rearrange various input control locations such that they are more comfortable and/or intuitive to the user. For example, a particular user may choose to have input controls adjusted such that they are moved closer together or further apart as set forth above. Any or all of the adjustments described above as well as other information may be stored in a user profile. In some cases, user profiles may be stored on a client device that is commonly employed by the user. Also, in some cases, user profiles may be stored on a content provider and/or server such that the user profiles may be accessible on a number of different connected client devices.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system configured for input control assignment, the computing system comprising:
    a touchscreen that at least temporarily displays at least a first input control and a second input control;
    one or more processors; and
    one or more memories having stored therein computer instructions that, upon execution by the one or more processors, cause the computing system to perform operations comprising:
        detecting a first touch at a first screen location;
        assigning the first touch to a first input control;
        detecting a second touch at a second screen location;
        calculating an angle and a distance of the second screen location relative to the first screen location; and
        assigning the second touch to the first input control or to a second input control based, at least in part, on the angle and the distance of the second screen location relative to the first screen location and on a first distance range and a second distance range, wherein at least one of the first distance range or the second distance range is adjusted, based at least in part, on a history of assignment of touches to input controls.

2. The computing system of claim 1, wherein the operations further comprise:
    identifying a plurality of distance ranges associated with the calculated angle, the plurality of distance ranges comprising the first distance range and the second distance range;
    determining which one of the plurality of distance ranges includes the calculated distance;
    assigning the second touch to the first input control when the first distance range includes the calculated distance; and
    assigning the second touch to a second input control when the second distance range includes the calculated distance.

3. The computing system of claim 2, wherein the plurality of distance ranges further comprises a third distance range, and wherein the second touch is not assigned to any input control when the third distance range includes the calculated distance.

4. The computing system of claim 2, wherein maintained angle and distance information indicates a first range of one or more angles that includes the calculated angle, and wherein the maintained angle and distance information further indicates that the first range of one or more angles is associated with the plurality of distance ranges.

5. A computer-implemented method for input control assignment comprising:
   detecting a first touch at a first screen location;
   assigning the first touch to a first input control;
   detecting a second touch at a second screen location;
   calculating an angle and a distance of the second screen location relative to the first screen location; and
   assigning the second touch to the first input control or to a second input control based, at least in part, on the angle and the distance of the second screen location relative to the first screen location and on a first distance range and a second distance range, wherein at least one of the first distance range or the second distance range is adjusted, based at least in part, on a history of assignment of touches to input controls.

6. The computer-implemented method of claim 5, further comprising:
   identifying a plurality of distance ranges associated with the calculated angle, the plurality of distance ranges comprising the first distance range and the second distance range;
   determining which one of the plurality of distance ranges includes the calculated distance;
   assigning the second touch to the first input control when the first distance range includes the calculated distance; and
   assigning the second touch to a second input control when the second distance range includes the calculated distance.

7. The computer-implemented method of claim 6, wherein the plurality of distance ranges further comprises a third distance range, and wherein the second touch is not assigned to any input control when the third distance range includes the calculated distance.

8. The computer-implemented method of claim 6, wherein maintained angle and distance information indicates a first range of one or more angles that includes the calculated angle, and wherein the maintained angle and distance information further indicates that the first range of one or more angles is associated with the plurality of distance ranges.

9. The computer-implemented method of claim 6, wherein assigning the first touch to the first input control comprises determining that the first screen location is closer to the first input control than to any other input control in a set of input controls that includes the first input control and the second input control.

10. The computer-implemented method of claim 5, wherein at least one of the first distance range or the second distance range is adjusted, based at least in part, on a physical characteristic of one or more users.

11. The computer-implemented method of claim 5, wherein at least one of the first distance range or the second distance range is adjusted, based at least in part, on demographic information associated with one or more users.

12. The computer-implemented method of claim 5, wherein information indicating at least one of the first distance range or the second distance range is stored in a user profile.

13. The computer-implemented method of claim 5, further comprising:
   determining that a reset condition has occurred, wherein the reset condition causes a third touch detected at a third screen location to be assigned to an input control irrespective of an angle and distance of the third screen location relative to the second screen location.

14. The computer-implemented method of claim 13, wherein the occurrence of the reset condition is determined based at least in part on a determination that the third screen location is greater than a particular distance from at least one of the first input control or the second input control.

15. The computer-implemented method of claim 14, wherein the reset condition is one of reaching an expiration of a threshold time period prior to detection of the third touch, a selection of a reset button, a performance of a reset gesture, a spoken reset command or an event or action occurring within a context of a video game.

16. One or more non-transitory computer-readable storage media having stored thereon instructions that, upon execution on at least one compute node, cause the at least one compute node to perform operations comprising:
   detecting a first touch at a first screen location;
   assigning the first touch to a first input control;
   detecting a second touch at a second screen location;
   calculating an angle and a distance of the second screen location relative to the first screen location; and
   assigning the second touch to the first input control or to a second input control based, at least in part, on the angle and the distance of the second screen location relative to the first screen location and on a first distance range and a second distance range, wherein at least one of the first distance range or the second distance range is adjusted, based at least in part, on a history of assignment of touches to input controls.

17. The one or more non-transitory computer-readable storage media of claim 16, wherein the operations further comprise:
   identifying a plurality of distance ranges associated with the calculated angle, the plurality of distance ranges comprising the first distance range and the second distance range;
   determining which one of the plurality of distance ranges includes the calculated distance;
   assigning the second touch to the first input control when the first distance range includes the calculated distance; and
   assigning the second touch to a second input control when the second distance range includes the calculated distance.

18. The one or more non-transitory computer-readable storage media of claim 17, wherein the plurality of distance ranges further comprises a third distance range, and wherein the second touch is not assigned to any input control when the third distance range includes the calculated distance.

19. The one or more non-transitory computer-readable storage media of claim 17, wherein maintained angle and distance information indicates a first range of one or more angles that includes the calculated angle, and wherein the maintained angle and distance information further indicates that the first range of one or more angles is associated with the plurality of distance ranges.

* * * * *

UNITED STATES PATENT AND TRADEMARK OFFICE
CERTIFICATE OF CORRECTION

| | |
|---|---|
| PATENT NO. | : 9,710,107 B1 |
| APPLICATION NO. | : 14/803607 |
| DATED | : July 18, 2017 |
| INVENTOR(S) | : Makuch et al. |

Page 1 of 1

It is certified that error appears in the above-identified patent and that said Letters Patent is hereby corrected as shown below:

On the Title Page

(72) Inventors:
Add inventor - Brian Robbins Denver, CO. (US)

Signed and Sealed this
Sixth Day of November, 2018

Andrei Iancu
*Director of the United States Patent and Trademark Office*